United States Patent [19]
Allen et al.

[11] 3,837,399
[45] Sept. 24, 1974

[54] COMBINED MULTIPLE SOLVENT MISCIBLE FLOODING WATER INJECTION TECHNIQUE FOR USE IN PETROLEUM FORMATIONS

[75] Inventors: Joseph C. Allen, Bellaire; Jack F. Tate; Jack H. Park, both of Houston, all of Tex.

[73] Assignee: Texaco Inc., New York, N.Y.

[22] Filed: May 4, 1973

[21] Appl. No.: 357,412

[52] U.S. Cl.................. 166/266, 166/267, 166/275
[51] Int. Cl............................................. E21b 43/20
[58] Field of Search .......... 166/266, 267, 273, 274, 166/275, 304

[56] References Cited
UNITED STATES PATENTS

| | | | |
|---|---|---|---|
| 2,725,106 | 11/1955 | Spearow | 166/268 |
| 2,842,204 | 7/1958 | Horner | 166/268 |
| 3,003,554 | 10/1961 | Craig, Jr. et al. | 166/274 |
| 3,157,231 | 11/1964 | Darley | 166/268 |
| 3,369,601 | 2/1968 | Bond et al. | 166/274 |
| 3,371,711 | 3/1968 | Odeh et al. | 166/268 |
| 3,729,053 | 4/1973 | Froning | 166/273 |

Primary Examiner—James K. Leppink
Attorney, Agent, or Firm—C. G. Ries

[57] ABSTRACT

A petroleum recovery method employing a mixed solvent for use in subterranean petroleum-containing formations. The mixed solvent density is less than the density of water and greater than the density of the formation petroleum, and preferably has a boiling point less than the boiling point of the formation petroleum. Water is injected into the bottom of the petroleum formation and solvent is injected into the formation above the depth at which water is injected, and a mixture comprising solvent and petroleum is recovered from production wells. The solvent may be separated from the produced petroleum-solvent mixture by distillation and recondensation for reinjection into the formation. The rate of water injection is controlled to force the horizontally moving solvent bank slowly upward so as to sweep the entire formation.

19 Claims, 1 Drawing Figure

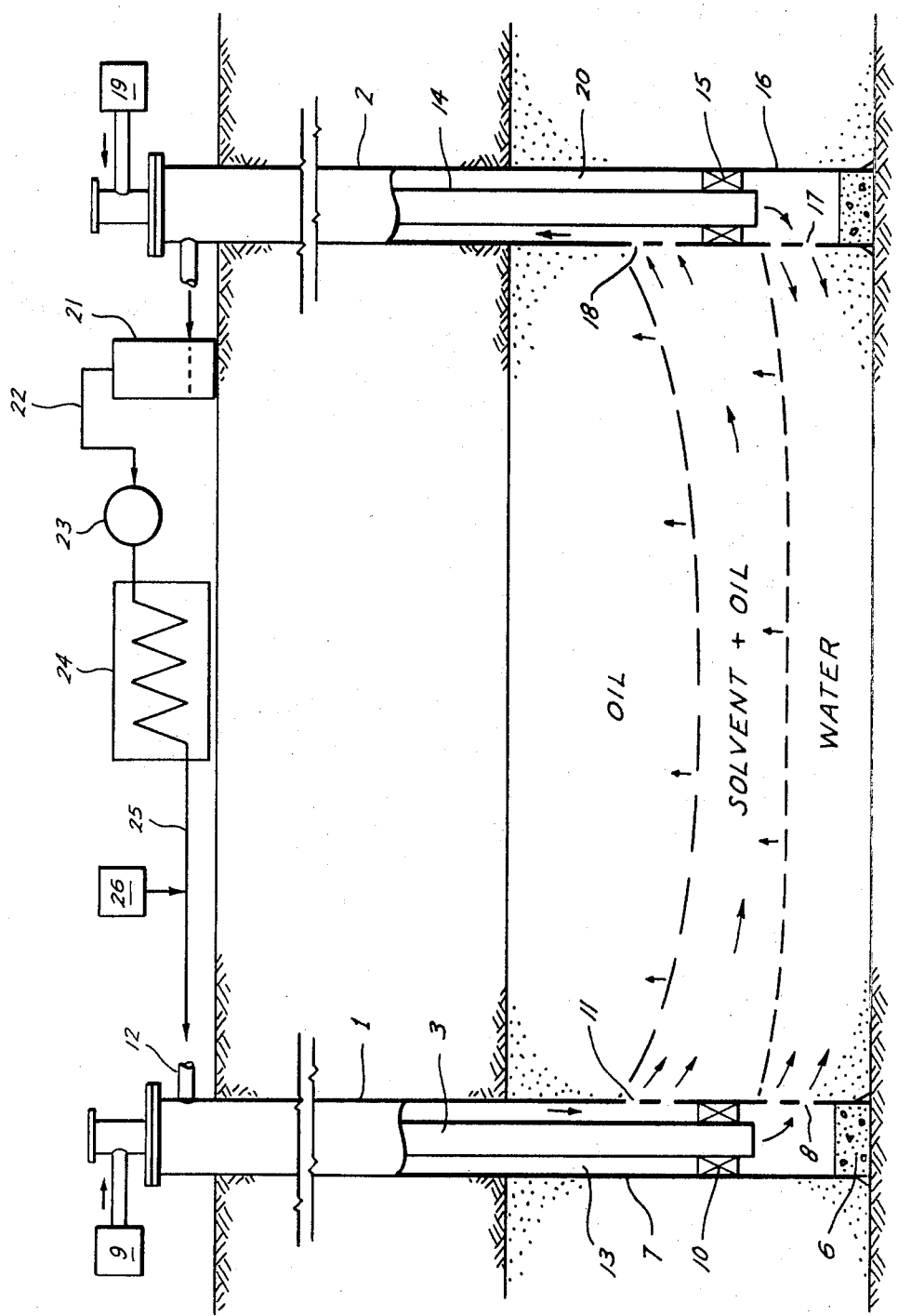

COMBINED MULTIPLE SOLVENT MISCIBLE FLOODING WATER INJECTION TECHNIQUE FOR USE IN PETROLEUM FORMATIONS

BACKGROUND OF THE INVENTION

1. Field of the Invention

This invention relates to a method of recovering petroleum from subterranean petroleum-containing formations, and more particularly to a combined miscible recovery-water injection technique especially adaptable for use in a subterranean, viscous petroleum-containing formation including tar sands. In a specific embodiment a mixture of a conventional solvent such as propane, butane, benzene or toluene capable of dissolving petroleum, and a dense solvent such as carbon disulfide or a halogenated hydrocarbon solvent such as carbon tetrachloride is injected into the formation and water is injected into the bottom of the formation.

2. Description of the Prior Art

Petroleum is normally recovered from subterranean formations in which it has accumulated by penetrating the formation with one or more wells and pumping or permitting the petroleum to flow to the surface through these wells. Recovery of petroleum from petroleum-containing formations is possible only if certain conditions are satisfied. There must be an adequately high concentration of petroleum in the formation, and there must be sufficient porosity and permeability of interconnected flow channels throughout the formations to permit the flow of fluids therethrough if sufficient pressure is applied to the fluid. Also, the petroleum viscosity must be low enough for the petroleum to flow in the formation if a pressure gradient is present or imposed on it. When the subterranean petroleum-containing formation has natural energy present in the form of an active, underlying water drive, or gas dissolved in the petroleum, or a high pressure gas cap above the petroleum, this natural energy is generally utilized to recover petroleum. Recovery of petroleum by utilization of natural energy is referred to as primary recovery. When this natural energy source is depleted, or in the instance of those formations containing petroleum too viscous to be mobile or formations which do not originally contain sufficient natural energy to permit primary recovery operations, some form of supplemental recovery process which supplies energy to the formation must be utilized in order to extract petroleum from the subterranean petroleum-containing formation. Supplemental recovery is frequently referred to as secondary or tertiary recovery, although in fact it may be primary, secondary or tertiary in sequence of employment.

Water flooding, which involves the injection of water into the subterranean formation for the purpose of displacing petroleum horizontally toward the producing well, is the most economical and widely practiced supplemental recovery method. Water does not displace petroleum with high efficiency, however, since water and oil are immiscible, and the interfacial tension between water and oil is quite high, and also because viscosities of petroleum and water are quite different. Persons skilled in the art of oil recovery have recognized this weakness in water flooding, and the prior art teaches injecting a hydrocarbon solvent or other material miscible with the formation petroleum into the formation. The solvent is capable of interacting with formation petroleum by directly solubilizing them or partitioning into them, thus reducing the viscosity thereof so they are more readily displaced toward the production well. This type of flooding is especially applicable to reservoirs containing very viscous oil, e.g. oil having a viscosity in the excess of 50 centipoise. Although miscible flooding using solvent injection is highly efficient in terms of total oil recovery efficiency, it is not particularly attractive from an economic point of view because of the relatively high cost of the solvent. The total cost of solvent flooding is often prohibitively expensive, even though the unit cost of solvent is relatively low, because of the large quantity of solvent required for a conventional solvent injection recovery operation. Attempts have been made to inject a small slug of solvent into the subterranean petroleum-containing formation, and follow this with water injection, with the hope that the solvent will mix with and dilute the formation petroleum, and the mixture of crude and solvent will then be displaced efficiently by the subsequently injected water. This has frequently met with failure for a variety of reasons, the most common being the tendency for the solvent to migrate downward to the lower portion of the petroleum-containing formation. Gravity differences between the conventional hydrocarbon solvents, water and the formation petroleum are responsible for segregation of fluids.

The most extreme example of viscous petroleum deposits which resist recovery by conventional means are the so-called tar sands or bitumen sands. The most famous of such deposits are the Athabasca tar sands in Alberta, Canada, although other large deposits are located in the United States and in Venezuela. Recovery is generally by strip mining or in situ separation. In situ separation has generally been by means of thermal stimulation involving in situ combustion or fireflooding, or by a combination steam-emulsification. None of the in situ separation techniques have been entirely successful in commercial operation, however.

In view of the foregoing, it can be appreciated that it is difficult to recover petroleum from a formation which contains relatively viscous petroleum, e.g., petroleum having a viscosity in excess of 50 centipoise, and that there is a substantial need for an oil recovery technique which will achieve efficient and inexpensive recovery of viscous petroleum.

SUMMARY OF THE INVENTION

We have discovered, and this constitutes our invention, that viscous petroleum may be recovered from subterranean petroleum-containing formations by injecting water into the bottom of the formation and injecting at a point above the point of water injection a solvent whose density is less than the density of water and greater than the density of the formation petroleum. In a preferred embodiment, the solvent has a boiling point less than the boiling point of the formation petroleum to facilitate surface separation of the solvent for reuse. The solvent is comprised of a mixture of conventional solvent capable of dissolving or partitioning into formation petroleum such as L.P.G., propane, butane, pentane, or naphtha, or an aromatic solvent such as benzene or toluene and a dense solvent such as carbon disulfide or a halogenated hydrocarbon solvent which is essentially insoluble in and unreactive with water, such as carbon tetrachloride or trichloromethane. By varying the proportions of the conventional solvent for petroleum and the dense solvent, a solvent mixture can be formulated which has a density intermediate between the density of water and the density of any particular formation petroleum to be recovered. If the boiling point of the solvent mixture is less than the boiling point of the formation petroleum, produced fluid, which comprises a mixture of formation petroleum and the injected solvent, can be separated on the surface, with the solvent being subjected to compression liquefaction and reinjected into the formation, thus reducing substantially the quantity of solvent necessary for a continuous solvent flooding operation according to our invention.

BRIEF DESCRIPTION OF THE DRAWING

The FIGURE is a cross-sectional view of a formation being subjected to the process of our invention, together with the surface equipment necessary for separation and recycling of the solvent.

DESCRIPTION OF THE PREFERRED EMBODIMENTS

This invention concerns a novel method for recovering petroleum from a subterranean, petroleum-containing formation especially formations containing relatively viscous petroleum including tar sands.

Our process makes use of a solvent system which has very special properties, and these properties may be tailored to the particular formation in which the process of our invention is to be applied. To be effective for the process described in this specification, the injected solvent system must have the following properties:

1. The specific gravity of the solvent must be less than the specific gravity of water.
2. The specific gravity of the injected solvent must be greater than the specific gravity of the petroleum contained in the formation to which the process is to be applied.

It is highly desirable that the solvent have the following additional properties:

1. The boiling point of the injected solvent mixture should be substantially less than the boiling point of the hydrocarbon fluid contained in the formation, to permit vacuum distillation of the solvent on the surface for reinjection of the solvent into the formation.
2. The thermal stability of each component should be such that they may be separated by vacuum distillation, if heat is required, without decomposition.
3. The components should not undergo any appreciable reaction with each other which would affect the chemical properties of the solvent system, nor should they react with or be appreciably soluble in water. This would eliminate certain halogenated organic compounds, such as, for example, allylic halides which are otherwise good solvents for petroleum.
4. The viscosity of the solvent should be less than the viscosity of water to avoid viscous fingering of water into the solvent.
5. The components of the solvent mixture should be relatively inexpensive and readily available.

No single solvent is believed to satisfy all these critical requirements, but a mixture of two or more components will satisfy the requirement. The mixture comprises:

1. A conventional solvent for petroleum, which is either an aliphatic hydrocarbon such as L.P.G. (liquefied petroleum gas), propane, butane, pentane, naphtha, and mixtures thereof, or an aromatic hydrocarbon such as benzene, toluene, etc.
2. A "dense" solvent, having a density substantially greater than the specific gravity of petroleum e.g., greater than 0.8 to 1.0. Suitable materials for the dense solvent include carbon disulfide, $CS_2$ and halogenated hydrocarbons which are insoluble in and essentially unreactive with water, such as carbon tetrachloride, $CCl_4$. As can be seen from the handbook data contained in Table I below, the specific gravity of carbon disulfide, carbon tetrachloride, trichloromethane and chlorobenzene are substantially greater than propane, butane, pentane and hexane. Moreover, the boiling points of these materials, especially carbon disulfide and carbon tetrachloride, are sufficiently low and thermal stability sufficiently high to permit relatively complete vacuum separation of these materials from the produced petroleum, and they are essentially unreactive with water at reservoir conditions.

TABLE I

Specific Gravities and Boiling Points of Solvents

| Material | Specific Gravity | Boiling Point °C |
| --- | --- | --- |
| Ethane ($C_2H_6$) | .546 | −88.6 |
| Propane | .585 | −42.2 |
| n-butane | .60 | −0.6 |
| n-Pentane | .630 | 36.3 |
| iso-Hexane | .654 | 60.2 |
| Benzene | .879 | 80.1 |
| Toluene | .866 | 110.8 |
| Carbon Disulfide | 1.263 | 46.3 |
| Trichloro methane (chloroform) | 1.498 | 60.0 |
| Carbon Tetrachloride | 1.595 | 76.8 |
| Chlorobenzene | 1.106 | 132.0 |

Carbon disulfide, also known as carbon bisulfide, is well known to be an effective solvent as well as a feed stock for manufacturing other solvents including carbon tetrachloride. Carbon disulfide is easily manufactured by heating coke and sulfur in an electric furnace. Carbon disulfide is insoluble in and unreactive with water and is an excellent solvent for most oils. It is especially suitable for dissolving asphaltic materials or bitumen, and since bitumen resists dissolution by most solvents, the use of carbon disulfide as the dense solvent component of the multiple component solvent mixture of our invention is especially suitable in applications to formations containing appreciable quantities of bitumen such as tar sands. Furthermore, the viscosity of carbon disulfide is substantially less than the viscosity of water, so water can displace carbon disulfide efficiently without viscous fingering. A carbon disulfide in water emulsion may also be used as the dense solvent.

Carbon tetrachloride is another excellent material for use as the dense solvent for this invention. As can be seen from the data in Table I above, it has a specific gravity greater than the specific gravity of carbon disulfide. Moreover, the dense solvent component may be comprised of a mixture of carbon disulfide and carbon tetrachloride. Other halogenated materials may also be used if readily available, but the cost of such materials may be prohibitive. Ordinarily the dense component of the solvent system will be either carbon disulfide or carbon tetrachloride or a mixture thereof. These mixtures comprise an especially favored embodiment since the hazards of flammability and low flash point associated with carbon disulfide would be largely overcome.

A conventional solvent for petroleum may be any readily available hydrocarbon or hydrocarbon derivative, although ordinarily a simple aliphatic hydrocarbon such as propane, butane, pentane, naphtha, or L.P.G., or an aromatic solvent such as benzene or toluene, will be suitable for use in this invention. It should be sufficiently inexpensive and readily available to permit its use without adversely affecting the economics of the operation.

The method of our invention is best understood by referring to the drawing illustrating in cross section a petroleum formation being exploited in accordance with the process of our invention. The petroleum-containing formation is penetrated in this example by an injection well 1 and production well 2. Injection well 1 is provided with a tubing string 3 terminated well above the bottom of injection well 1. The bottom of injection well 1 is closed off by means of a cement plug 6 and casing 7 has perforations 8 between the bottom of tubing 3 and cement plug 6. Tubing 3 is connected on the surface to a pressurized source of water 9 which can be injected down tubing 3 out through perforations 8 into the lower part of the formation.

A packer 10 seals the outer tubing surface from the inside of casing 7. Perforations 11 are made in casing 7 above packer 10. The top of injection well 1 is provided with a means 12 for injecting fluid into the annular space 13 between tubing 3 and casing 7. This creates a separate communication path from the surface to the formation for injection of solvent independent of water injection.

Production well 2 is similarly completed with tubing 14 packed off by packer 15 from casing 16. Perforations 17 are formed below the packer and perforations 18 are formed above the packer. Tubing 14 is connected to a source of water 19 so that water can be pumped into or out of the formation via tubing 14 through perforations 17. The upper part of well 2 is provided with a fluid connection into annular space 20 so a mixture of injected solvent and petroleum can be produced through perforations 18 and annular space 20 to the surface of the earth.

On the surface, the produced solvent-petroleum mixture enters separator tank 21 which may be equipped with a stirring or mixing apparatus. The suction line 22 of compressor 23 is connected to the top of separator tank 21. Vacuum from compressor 23 causes the solvent to boil in separator tank 21. Vaporized solvent moves through line 22 to compressor 23 where it is compressed and then the vapor flows to condenser 24 where it condenses to a liquid. Liquid solvent passes through line 25 where it is mixed with solvent from supply vessel 26 if necessary and reinjected into injection well 1 as previously described.

In the practice of our invention, it may be necessary to inject solvent at first without injecting water, to dissolve the petroleum from the lower part of the reservoir. (If there is already a water filled zone underlying the petroleum-saturated formation, this step is not necessary.) If solvent injection without water injection is undertaken, the solvent will move to the lowest part of the formation because the specific gravity of the solvent is greater than the specific gravity of petroleum. Solvent injection continues until solvent and oil are being produced from the production well, and the concentration of petroleum in the solvent begins to decrease. A decrease in solvent concentration indicates the lowest portion of the formation has been essentially depleted of petroleum.

Once a zone at the bottom of the formation has been depleted of petroleum, water injection is begun via tubing 3 and 14 in wells 1 and 2 respectively. The purpose for injecting water in the formation is to move the solvent zone upward so it is continually contacting undissolved petroleum. Water injection is continued into both wells as needed to keep the solvent-water interface at essentially the same depth adjacent to the injection well as it is at the production well.

The process continues, with solvent moving horizontally in a thin zone, and the solvent zone itself moving slowly upward, until the formation is essentially depleted of hydrocarbons. At this point the solvent zone will be at the top of the petroleum formation. Water may then be injected into the injection well through the upper perforations to displace the remaining solvent through the formation for recovery.

Throughout the process described above, vacuum solvent separation on the surface continues, with the solvent being compressed and liquefied for reinjecting into the formation. By recycling the solvent, a much smaller total volume of solvent is required.

Initially, essentially all of the injected solvent will be obtained from commercial suppliers and injected into the well via vessel 26. When the produced fluids contain sufficient solvents to justify separation, increasing proportions of the injected solvent will be obtained from the components extracted from the produced fluid, until most of the solvent injected will be derived from the surface separation-reliquefication equipment. Although it is not an essential feature of this invention that the solvent be separated from the produced crude, reliquefied and injected by the injection well, the cost of operating the process of our invention without the solvent recycling feature may make the process uneconomical.

In another embodiment of our invention, a gas capable of dissolving in the petroleum and causing it to swell is injected simultaneously with the solvent mixture. For example, carbon dioxide $CO_2$ may be dissolved in the solvent mixture, or may be injected separately into the formation. Carbon dioxide migrates upward into the oil-saturated zone, and dissolves in the petroleum. Dissolution of carbon dioxide in petroleum causes the petroleum to swell and reduces the viscosity thereof. The petroleum viscosity reduction resulting from the use of carbon dioxide is additive to the viscosity reduction resulting from the solvent diluting the petroleum, and so the overall effectiveness of the process is improved.

It should be stressed that the process as described above differs substantially from a conventional horizontal displacement process, whether of a water flood type or one involving the injection of a solvent slug followed by a water injection. In the instant invention, only a small portion of the reservoir is invaded by the injected solvent on a single pass, or at any given time. A pancake-shaped zone extending outward from the injection point to the production well or wells is formed by the injected solvent. As the injected solvent dissolves formation petroleum, the area previously occupied by the formation petroleum is reoccupied by water injected into the bottom of the formation, so the pancake-like zone of solvent action slowly moves upward as the process continues. Thus the zone being swept by the injected solvent in any given time represents a small percentage of the total pore volume of the formation, which materially reduces the amount of solvent required. Injection of solvent continues, with the interfacial zone between the formation petroleum and the solvent, and the interfacial zone between the solvent and the underlying water both slowly moving upward, until essentially all of the formation has been swept by the solvent.

The invention can be more fully understood by reference to the following field example, which is offered only for the purpose of illustration and is not intended to be limited or restrictive of the invention, which will be defined more precisely hereinafter in the claims.

FIELD EXAMPLE

A subterranean, petroleum-containing formation is found at a depth of 800 feet, and it is determined that the thickness of the formation of 95 feet. It is also discovered that the average viscosity of the formation fluid is 200 centipoise. Attempts to recover petroleum from this formation by conventional primary recovery means are ineffective, due to the high viscosity of the petroleum. Attempts to pump the petroleum from production wells are unsuccessful.

The API gravity of the petroleum contained in this formation is 20° (7.7 pounds per gallon). Since water has a density of 8.33 pounds per gallon, it is necessary to obtain a solvent having a density between 7.7 pounds per gallon and 8.33 pounds per gallon. It is determined that this criteria is best met by mixture of 62% by weight carbon disulfide and 38% by weight butane, resulting in a solvent density of 8.04 pounds per gallon. The 62% carbon disulfide, 38% butane mixture is injected into the formation via the annulus and water is injected therebelow via the tubing. Production is taken from the annulus of a production well drilled into the formation for that purpose and perforated near the center of the oil-containing interval. Water is also injected via the tubing of the production well. The produced fluid is thereafter pumped into a vacuum separation vessel connected to the suction of a compressor located on the surface. Since the atmospheric boiling point of butane and carbon disulfide are 30°F. and 150°F. respectively, the solvent is completely vaporized within the vacuum separation vessel, compressed by the surface compressor and thereafter reliquefied in a condenser for reinjection into the formation. This operation is continued, continually separating the injected fluid, compressing and reliquefying it and reinjecting it into the injection well, until the swept zone has been forced upward into the upper portion of the oil saturated interval by water injected into the bottom of the formation. After the swept zone has moved to the uppermost portion of the oil-saturated interval, and essentially no additional formation petroleum is being recovered, the solvent mixture remaining in the formation is recovered by water injection or injection of other inexpensive solvent such as natural gas, ethane, propane, butane, etc. via the upper perforations until all the more expensive solvent materials have been recovered by the surface equipment for reuse in other similar recovery operations.

It can be seen from the above example that a conventional solvent for petroleum would not function satisfactorily if utilized according to the procedural description above. Injection of butane into the formation with water injection below would not achieve the type of displacement described above. Since butane has a specific gravity substantially less than the specific gravity of the formation petroleum, it would move upward into the oil saturated zone, lose its discreteness, and bypass a substantial portion of the oil between the injected butane and the water saturated zone below. Further more, the solvent system of our invention could not be utilized in a downward moving displacement as is sometimes utilized, since the specific gravity of the injected fluid would cause fingering into the oil saturated zone, which would result in bypassing a significant portion of petroleum.

While numerous specific embodiments of both the solvent components and the procedure for using them have been disclosed, many other embodiments will be apparent to those skilled in the art of oil recovery operation without departing from the true spirit and scope of our invention, and it is intended that the spirit and scope of this invention be defined only by the claims which are appended hereinafter below.

We claim:

1. A method for recovering petroleum from a subterranean, petroleum-containing formation, penetrated by at least one dually completed injection well and by at least one dually completed production well, comprising:
   a. injecting into said formation via the injection well a solvent for petroleum, said solvent having a density less than the density of water and greater than the density of the petroleum contained in the formation;
   b. injecting water into the lower part of the petroleum formation via both the injection well and production well;
   c. producing the solvent with formation petroleum dissolved therein at the production well.

2. A method as recited in claim 1 wherein the conventional solvent for petroleum is naphtha.

3. A method as recited in claim 1 wherein the produced fluid consisting of formation petroleum and injected solvent is subjected at the surface to vacuum separation, wherein the solvent is separated in the vapor phase and subsequently compressed and reliquefied, and reinjected into the injection well.

4. A method as recited in claim 1 wherein carbon dioxide is also injected into the petroleum reservoir.

5. A method as defined in claim 1 wherein the solvent having a density less than the density of water and greater than the density of petroleum contained in the formation comprises a mixture of a hydrocarbon solvent and a dense solvent for petroleum having a density greater than the density of formation petroleum.

6. A method as defined in claim 1 wherein the solvent comprises:
   a. a conventional solvent for petroleum, and
   b. a solvent for petroleum having density greater than the density of the formation petroleum.

7. A method as recited in claim 6 wherein the oil solvent having a density greater than the density of the petroleum contained in the formation is selected from the group consisting of carbon disulfide and halogenated hydrocarbons which are essentially insoluble in and unreactive with water.

8. A method as recited in claim 6 wherein the conventional solvent for petroleum is an aromatic solvent.

9. A method as recited in claim 8 wherein the conventional solvent for petroleum is benzene.

10. A method as recited in claim 8 wherein the conventional solvent for petroleum is toluene.

11. A method as recited in claim 6 wherein the conventional solvent for petroleum is selected from the group consisting of ethane, propane, butane, pentane, hexane, naphtha, liquefied petroleum gas, and mixtures thereof.

12. A method as recited in claim 11 wherein the conventional hydrocarbon solvent is butane.

13. A method as recited in claim 11 wherein the conventional hydrocarbon solvent is propane.

14. A method as recited in claim 11 wherein the conventional solvent for petroleum is pentane.

15. A method as recited in claim 11 wherein the conventional solvent for petroleum is hexane.

16. A method as recited in claim 11 wherein the conventional solvent for petroleum is liquefied petroleum gas.

17. A method as recited in claim 16 wherein the petroleum solvent having a density greater than the density of the formation petroleum is carbon disulfide.

18. A method as recited in claim 16 wherein the halogenated hydrocarbon petroleum solvent having a density greater than the density of the formation petroleum is carbon tetrachloride.

19. A method as recited in claim 16 wherein the halogenated hydrocarbon petroleum solvent having a density greater than the formation petroleum is trichloromethane.

* * * * *

PO-1050
(5/60)

UNITED STATES PATENT OFFICE
CERTIFICATE OF CORRECTION

Patent No. 3,837,399      Dated September 24, 1974

Inventor(s) Joseph C. Allen, Jack F. Tate, Jack H. Park

It is certified that error appears in the above-identified patent and that said Letters Patent are hereby corrected as shown below:

Claim 2 should read -- A method as recited in claim 6 wherein ... --.

Claim 17. Change "16" to -- 7 --.

Claim 18. Change "16" to -- 7 --.

Claim 19. Change "16" to -- 7 --.

Signed and sealed this 18th day of February 1975.

(SEAL)
Attest:

RUTH C. MASON
Attesting Officer

C. MARSHALL DANN
Commissioner of Patents
and Trademarks